Jan. 27, 1925.
F. H. LANDRUM ET AL
METHOD OF STERILIZING ORGANIC MATTER
Filed Feb. 21, 1917
1,524,623
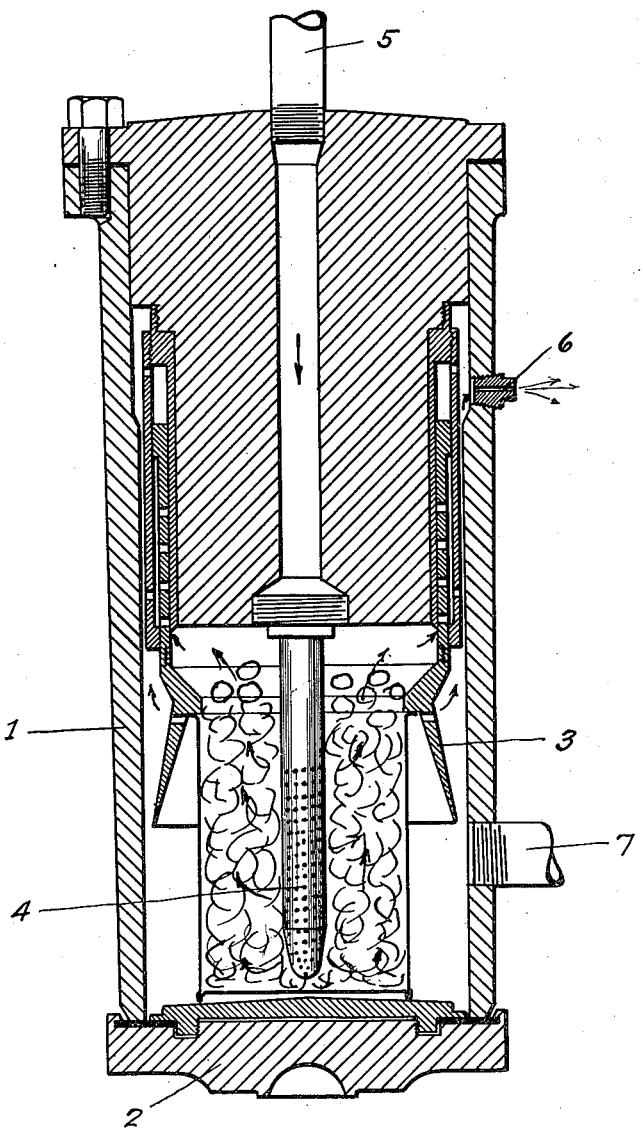
Francis H. Landrum
Albert N. Cramer
INVENTOR.
BY
Edwin P. Corbett
ATTORNEY.

Patented Jan. 27, 1925.

1,524,623

UNITED STATES PATENT OFFICE.

FRANCIS H. LANDRUM AND ALBERT N. CRAMER, OF COLUMBUS, OHIO, ASSIGNORS TO THE WEDOIT COMPANY, OF COLUMBUS, OHIO.

METHOD OF STERILIZING ORGANIC MATTER.

Application filed February 21, 1917. Serial No. 149,988.

*To all whom it may concern:*

Be it known that we, FRANCIS H. LANDRUM and ALBERT N. CRAMER, citizens of the United States of America, residing at Columbus, in the county of Franklin and State of Ohio, have invented certain new and useful Improvements in Methods of Sterilizing Organic Matter, of which the following is a specification.

Our invention relates to an improved method of sterilizing organic matter and is fundamentally based upon the use of a treating medium which is directly applied to the product as opposed to the method generally in use at the present time which comprises applying a heating medium to the exterior of a receptacle within which the product is contained. This application has to do particularly with the sterilization of those products generally classed in the arts as fruits and vegetables. With certain vegetables it may be desirable to use our method in conjunction with the external application of the treating medium to the sealed receptacles.

Our invention further contemplates the use of what may be termed a transient heating medium. This transient heating medium may be steam or it may be some other fluid.

Although our invention is based upon sterilization by steam, it has certain aspects which are in no sense limited to a steam treatment. The nature of this, however, will me made apparent more readily by setting forth the manner in which steam is used to attain results.

Cooking of the product is, in a large percentage of cases, extremely undesirable because it destroys the natural flavor, color and texture of the product. Our method takes cognizance of this fact and of the fact discovered by us that these bacteria may be caused to succumb to directly applied steam at high temperature for a short length of time so as to render the product sterile without cooking the product to any material degree. As a matter of fact such cooking action as we have is practically superficial.

In obtaining results, we directly apply steam to the product to be sterilized and this steam is preferably impregnated with water. The temperature of the steam is very high and its period of application is very brief. The number of the heat units is sufficient to destroy the bacteria and render the product sterile substantially without cooking. This results from the fact that the bacteria succumb to a certain number of heat units and that these heat units are applied for a definite short length of time, whereas cooking results from a more extended application of the heating medium either as to time or number of heat units. Stating the matter in another way, the heat units and their period of application necessary to bring about sterilization are, in practically all products, less than necessary for cooking. Our invention therefore contemplates the sterilization of fruits and vegetables substantially without cooking.

As far as we are able to ascertain, it has never been fully realized that complete sterilization could be effected without cooking the product. We have discovered, that if the product is in a commercially fresh state, the bacteria will be so accessible and responsive to such a temperature for a given period of time that they can be destroyed substantially without cooking the product. It is our aim to apply such a number of heat units to the product for such a length of time that the bacteria are destroyed and the product made sterile without cooking this product. The time element is important in this matter and we have practically precluded cooking by materially shortening the time of application of the heating medium.

Another important feature of our invention contemplates the application of the treating fluid directly to the product in such a manner that this product is agitated. This highly important feature, we feel is new in the treatment of fruits and vegetables. This is not a step which inevitably follows in every product by the direct application of steam thereto; but the steam must be introduced in a definite manner or agitation will not result. The agitation is more fully assured by the boiling moisture mingled with the steam in the can. When agitation takes place, the treating medium reaches all surfaces of each unit of the product and insures sterility. It may maintain the pieces or units of the product in a balanced state or it may simply subject all of their surfaces for a sufficient length of time to the treating medium. It is a nice question as to which condition results, but agitation is necessary if complete success is to be had.

Agitation is procured preferably by introducing the steam gradually and by exhausting it gradually. The control of the inlet and outlet of the steam controls the agitation and care must be taken that the steam does not drive any portion of the product against the side of the can or other receptacle or, in fact, against any surfaces which may tend to mutilate. The introduction or the exhaust of the steam too rapidly may serve to choke the draft through the product and result in a plugging which would prevent the proper agitation of the pieces of the product so as to render their surfaces accessible to the treating medium. It would further tend to permanently choke the draft in some measure.

In the application of our method, we have found it desirable to provide a continuous outlet for the steam so as to ensure that the sterilization of the product will be effected in the absence of air. The steam passing through expels the air and simplifies the sterilizing operation.

The accompanying drawing illustrates our improved device for carrying out the methods described. This device is one of a series and is normally mounted and operated as shown and described in our co-pending application Serial No. 149,990.

As shown in the drawing the device comprises a receiving chamber 1 which has a closure 2 adapted to receive the vessels containing the product to be sterilized and to seal the lower end of the chamber during such sterilization. The top of the vessel is engaged by a telescopic member 3 which provides a chamber wherein the product may expand during the sterilizing operation.

The nozzle 4 is supplied by the sterilizing medium, preferably steam, from the main source of supply through the conductor 5. The passage of steam through this conductor is regulated preferably by a mechanically operated ported main valve (shown in our co-pending case, Serial No. 149,990) which acts as a timing and regulating element.

The chamber 1 is provided near its upper end with a vent 6, which is open to the air and permits the passage of fluids. This vent may be varied or regulated to insure the flow of steam whereby the proper degree of agitation may be assured for each particular product being sterilized. The chamber 1 is further provided with a conductor 7 which is also preferably operated by the main valve.

In operation, the treating medium is admitted through the ported main valve in a series of impulses. These impulses normally tend to agitate the product, but such agitation is further augmented by the continuous escape of a regulated quantity of the gases through the vent 6. Therefore, by regulating the induction of the treating medium into the vessel and also regulating the escape of the gases from the vessel and the chamber, we are able to control the degree of the agitation of the product, and at the same time control the pressure and temperature of the treating medium.

The vent 6 further provides an opening near the top of the chamber whereby the air may be expelled. Steam is preferably used, and the induction of the steam at the bottom of the product causes the air to rise and seek the vent from whence it is expelled.

In using our method, we have found it desirable to treat fruits by placing them in an open receptacle, preferably in the cans or jars which are to be subsequently placed upon the market. These cans or jars are then successively passed through a machine of the type referred to above and this machine serves to introduce a nozzle into each can, which nozzle discharges steam at or near the base of the can. The steam has an outlet at the top of the can and it is introduced and exhausted with sufficient rapidity and so gradually that the units or pieces of the product are agitated so as to expose all of their surfaces. The structure of the apparatus is such that the steam drives the air out of the can. The temperature varies from 212° to 260° F. and the time of application is preferably from five to sixteen seconds. The ports of the sterilizing machine are such that the steam is introduced into each can in successive jets, although a continuous and uninterrupted supply of steam may be used.

After the cans containing the fruits leave the sterilizing machine, they are filled with a sterile liquid preferably at a temperature of from 150° to 210° F. Then the cans are closed and sealed by the application of a previously sterilized cap, this cap having been sterilized by a special apparatus used during the approach of the can to the point of sealing.

In performing our method, it is extremely important that the steam utilized be moist and experiments have demonstrated that it is desirable in many instances to add water approximately at steam temperature to the steam before it reaches the product. Results can be accomplished with heated water at a high temperature restrained from complete evaporation providing care is taken to treat the product for the proper length of time and in the proper manner.

Attention is called to the fact that our process contemplates the introduction of the treating medium in such a way that there will be a certain amount of circulation, so that the bacteria will be loosened from the product, both the product and the loosened bacteria being then submerged or surrounded with a film of the treating fluid. This circulation may be continuous or intermittent and experience has demonstrated that such constant circulation as may result from condensation must ordinarily be amplified, for it is the draft through the product that causes agitation, and simple condensation without outward flow will not agitate the product.

Before subjecting fruits to the method it may be desirable to heat them in an exhaust box to a temperature between 120° and 212° F. After the application of the method and the sealing of the cans it is well to artificially cool these cans.

Vegetables are treated in practically the same way with the exception that they are subjected in the sterilizing machine to a temperature of between 260° to 335° F. In addition, it may be desirable to subject some vegetables after leaving this process to supplemental treatment in an exhaust box or a steam retort for a comparatively limited time.

Summarizing, we believe ourselves to be the first to sterilize without cooking and furthermore to be the first to utilize a transient sterilizing medium while the pieces or units of solid matter are being agitated, particularly when this agitation is being effected by the sterilizing medium itself. Also our method contemplates the introduction of the treating medium in such a manner as to wash the units or pieces of the product and with such care that a circulation is maintained without choking or plugging the apparatus. In addition, we believe ourselves to be the first to use steam at a very high temperature for a brief period of time and, furthermore we believe ourselves to be the first to use moist steam at a very high temperature, particularly, when water is added to this steam before it reaches the product being treated.

The apparatus preferably used in this method comprises first a central unit of the type disclosed by the patent indicated above. The product to be treated is to be placed in open cans and is preferably heated in an exhaust box to between 120° and 212° F. After leaving this exhaust box, the open cans are presented to the central unit machine and each can or jar receives a series of injections of steam at a high temperature and pressure. The steam is so introduced that the product in the cans or jars is agitated and all of the units or pieces of the product have their surfaces fully subjected to the treating medium, the apparatus being such that the treating medium automatically expels the air from the cans or jars and effects sterilization in the absence of air. The treating action is at the temperatures and for the periods of time indicated. When the cans leave the central unit, they are filled with a sterile liquid, preferably hot and the constantly rising current of heat precludes the entrance of bacteria into the product in their approach to the sealing apparatus. Simultaneously with their approach to the sealing apparatus, caps are moved into position for sealing and during the movement of these caps in position for sealing, they are automatically sterilized. The passage-way of the open cans to the sealing machine is preferably covered with a heated plate, desirably of a dry nature, or of such a nature and form as to preclude the deposit of foreign matter in the cans.

After sealing, it is desirable in practically all cases, that the cans be subjected to an artificial cooling action. The interval of time between the sterilizing action of the machine and artificial cooling may be lengthened to ensure that bacteria which may occasionally be deeply buried in a unit of the product will be destroyed by the latent heat.

Having thus described our invention, what we claim is:

1. The process of sterilizing fruits and vegetables which comprises passing saturated wet steam of at least atmospheric pressure into a mass thereof so as to agitate the mass and continuing the application of such steam for a substantial period of time, approximately 5 to 16 seconds, to sterilize the mass without cooking it.

2. The process of sterilizing fruits and vegetables which comprises passing saturated wet steam above atmospheric pressure into a mass thereof so as to agitate the mass and continuing the application of such steam for a substantial period of time, approximately 5 to 16 seconds, to sterilize the mass without cooking it.

In testimony whereof, we hereby affix our signatures.

FRANCIS H. LANDRUM.
ALBERT N. CRAMER.